US012614185B1

(12) United States Patent
Smith et al.

(10) Patent No.: US 12,614,185 B1
(45) Date of Patent: Apr. 28, 2026

(54) TRACKING SYSTEMS AND METHODS FOR PURCHASE DEVICES

(71) Applicant: United Services Automobile Association (USAA), San Antonio, TX (US)

(72) Inventors: Arthur Quentin Smith, Fredericksburg, TX (US); Oscar Guerra, San Antonio, TX (US); Timothy Blair Chalmers, San Antonio, TX (US); Noe Alberto Martinez, San Antonio, TX (US); Justin Dax Haslam, San Antonio, TX (US); Robert Lee Black, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 305 days.

(21) Appl. No.: 17/974,909

(22) Filed: Oct. 27, 2022

Related U.S. Application Data

(60) Provisional application No. 63/273,307, filed on Oct. 29, 2021.

(51) Int. Cl.
| | |
|---|---|
| *G06Q 20/00* | (2012.01) |
| *G06Q 20/20* | (2012.01) |
| *G06Q 20/40* | (2012.01) |
| *G07G 1/01* | (2006.01) |

(52) U.S. Cl.
CPC .......... *G06Q 20/405* (2013.01); *G06Q 20/20* (2013.01); *G07G 1/01* (2013.01)

(58) Field of Classification Search
CPC .. G06F 3/016; G06Q 20/227; G06Q 20/3224; G06Q 20/341; G06Q 20/353; G06Q 20/3563; G06Q 20/357; G06Q 20/4015; G06Q 20/40155; G07F 7/0833; G07F 7/0846; G06K 19/07705; B32B 2425/00
See application file for complete search history.

(56) References Cited

U.S. PATENT DOCUMENTS

| | | | | |
|---|---|---|---|---|
| 8,413,894 | B2 * | 4/2013 | Bona ..................... | G06Q 20/385 235/487 |
| 8,628,017 | B2 * | 1/2014 | Bona ................ | G06K 19/07705 235/487 |
| 10,360,556 | B2 * | 7/2019 | Look ..................... | G06Q 20/354 |
| 10,963,768 | B2 * | 3/2021 | Mosteller ................ | H01Q 7/00 |
| 11,048,991 | B2 * | 6/2021 | Mosteller ........... | B42D 25/475 |
| 11,055,700 | B1 * | 7/2021 | Goodsitt .............. | G06Q 20/357 |
| 11,108,877 | B2 * | 8/2021 | Vyas ..................... | H04L 67/535 |

(Continued)

FOREIGN PATENT DOCUMENTS

WO     WO-2019234419 A1 * 12/2019    ............. G06F 3/016

*Primary Examiner* — Florian M Zeender
*Assistant Examiner* — Milena Racic
(74) *Attorney, Agent, or Firm* — Fletcher Yoder P.C.

(57) ABSTRACT

A tracking system includes one or more processors configured to receive purchase data related to a purchase being attempted by a user, determine a purchase score for the purchase based on characteristics of one or more items of the purchase, and determine a change to an overall purchase score for the user that would occur upon completion of the purchase. The one or more processors are also configured to provide, prior to the completion of the purchase and via a purchase device of the user, an output that indicates the change.

20 Claims, 3 Drawing Sheets

(56) References Cited

U.S. PATENT DOCUMENTS

| | | | |
|---|---|---|---|
| 11,494,606 B2 * | 11/2022 | Mullen | G06V 10/25 |
| 11,615,281 B2 * | 3/2023 | Yarabolu | G06K 19/07703 |
| | | | 235/494 |
| 11,797,818 B2 * | 10/2023 | Vargas | G06K 19/06187 |
| 11,847,572 B2 * | 12/2023 | Zhao | G06N 3/045 |
| 11,989,603 B2 * | 5/2024 | Coleman | G06K 19/0723 |
| 2009/0277968 A1 * | 11/2009 | Walker | G07F 7/08 |
| | | | 235/487 |
| 2011/0101109 A1 * | 5/2011 | Bona | G06Q 20/4016 |
| | | | 235/492 |
| 2012/0205451 A1 * | 8/2012 | Poidomani | G06K 19/077 |
| | | | 235/492 |
| 2012/0298747 A1 * | 11/2012 | Mestre | G06Q 20/3563 |
| | | | 235/492 |
| 2021/0035109 A1 * | 2/2021 | Wong | G07F 7/0833 |
| 2021/0056581 A1 * | 2/2021 | Kumar | G06Q 50/06 |
| 2021/0224791 A1 * | 7/2021 | Gower | G06Q 20/352 |
| 2022/0027694 A1 * | 1/2022 | Yarabolu | G06K 19/16 |
| 2023/0092596 A1 * | 3/2023 | Kartoun | H04L 63/10 |
| | | | 726/3 |
| 2023/0128845 A1 * | 4/2023 | Brodsky | G06Q 20/4015 |
| | | | 705/44 |
| 2024/0375618 A1 * | 11/2024 | Nichols | G07C 5/008 |

* cited by examiner

OVERALL PURCHASE
SCORE 8.5

GREAT WORK!
TODAY'S PURCHASES
RAISED YOUR
OVERALL PURCHASE
SCORE BY 0.5 POINTS.

CLICK FOR MORE DETAILS

OVERALL PURCHASE
SCORE TREND

LOWEST PURCHASE
SCORE:
CASINO, 6/5/2021
HIGHEST PURCHASE SCORE:
GROCERIES, 1/5/2021

CURRENT AVAILABLE
SPENDING AMOUNT: $100
ESSENTIAL ITEMS ONLY

ALERT!

CURRENT PURCHASE
WILL REDUCE YOUR
OVERALL PURCHASE
SCORE BY 0.5 POINTS

TRACKING SYSTEMS AND METHODS FOR PURCHASE DEVICES

BACKGROUND

This application claims priority to and the benefit of U.S. Provisional Application No. 63/273,307, entitled "TRACKING SYSTEMS AND METHODS FOR PURCHASE DEVICES" and filed on Oct. 29, 2021, the disclosure of which is incorporated by reference herein in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A point of sale (POS) is generally understood to reference a place and/or a point in time where a transaction (e.g., a retail or service transaction) is performed. Traditionally, at the point of sale, a provider (e.g., a merchant or service provider) coordinates with a purchaser (e.g., a customer) to exchange goods and/or services for payment. As a specific example, a purchaser may identify a desired purchase (e.g., a particular item of merchandise or a particular service), and the provider may then determine and/or request payment of an amount owed by the purchaser for the desired purchase. Upon review of the amount, the purchaser may then pay the provider the amount via a payment method.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a tracking system includes one or more processors and a memory storing instructions executable by the one or more processors to cause the one or more processors to receive purchase data related to a purchase being attempted by a user, determine a purchase score for the purchase based on characteristics of one or more items of the purchase, and determine a change to an overall purchase score for the user that would occur upon completion of the purchase. The instructions are executable by the one or more processors to cause the one or more processors to provide, prior to the completion of the purchase and via a purchase device of the user, an output that indicates the change.

In certain embodiments, a method of operating a tracking system, the method includes receiving, at one or more processors, purchase data related to a purchase being attempted by a user, wherein the purchase data indicates characteristics of one or more items of the purchase. The method also includes determining, using the one or more processors, a purchase score for the purchase based on the characteristics of the one or more items of the purchase. The method further includes determining, using the one or more processors, a change to an overall purchase score for the user that would occur upon completion of the purchase. The method further includes providing, using the one or more processors and prior to the completion of the purchase and via a purchase device of the user, an output that indicates the change.

In certain embodiments, a tracking system includes a payment card with one or more light sources. The tracking system also includes one or more processors and a memory storing instructions executable by the one or more processors to cause the one or more processors to receive purchase data related to a purchase being attempted by a user, determine a purchase score for the purchase based the purchase data, and determine a change to an overall purchase score for the user that would occur upon completion of the purchase. The instructions are executable by the one or more processors to cause the one or more processors to instruct, prior to the completion of the purchase, the one or more light sources to illuminate to provide an output that indicates the change.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
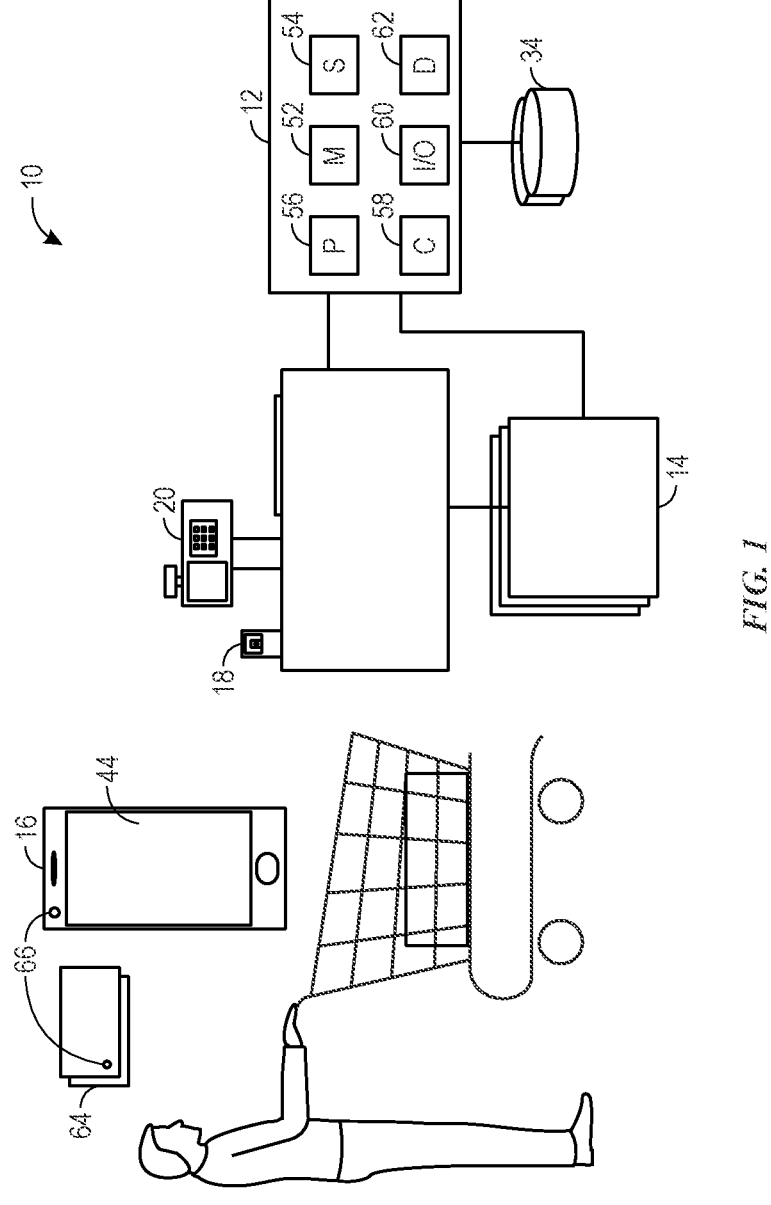
FIG. 1 is a schematic diagram of a tracking system that is configured to track purchases, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to a tracking system (e.g., purchase tracking system) that is configured to monitor purchases made by various users (e.g., purchasers). In particular, the tracking system may monitor the purchases made by the various users, determine characteristics of the purchases, and calculate a respective overall purchase score (e.g., rating) for each of the various users based on the characteristics of the purchases. For example, on a first day, a first user may purchase groceries from a grocery store, while a second user may purchase luxury clothing from a luxury clothing store. In such cases, the tracking system may receive purchase data (e.g., from point of sale systems) for the purchases, determine the characteristics of the purchases based on the purchase data, calculate (e.g., adjust upwardly) the respective overall purchase score for the first user, and calculate (e.g., adjust downwardly) the respective overall purchase score for the second user.

Similarly, on a second day, the first user may purchase sporting equipment from a sporting equipment store, while the second user may purchase home repair materials from a home improvement store. In such cases, the tracking system may receive the purchase data for the purchases, determine the characteristics of the purchases based on the purchase data, calculate (e.g., adjust downwardly) the respective overall purchase score for the first user based on an adjustable scoring configuration (e.g., configurations can be for individuals or groups that represent priorities of each individual or group), and calculate (e.g., adjust upwardly) the respective overall purchase score for the second user based on the adjustable scoring configuration. In this way, the tracking system may calculate and maintain the overall purchase scores for the various users over time. Each overall purchase score may generally reflect an ability of a corresponding user to make appropriate purchases and/or avoid non-essential purchases.

The tracking system may also include or be used together with purchase devices that are configured to provide feedback indicative of the overall purchase scores to the users. For example, the first user may carry a purchase device, such as a payment card (e.g., credit card, debit card, gift card), a wearable device, an embedded device, and/or a mobile phone. The first user may utilize the purchase device to complete purchases, such as to submit payment to providers (e.g., merchants, sellers). The purchase device may include one or more light sources (e.g., light emitters), or use sounds, or touches that are configured to illuminate/tone/ vibrate based on the overall purchase score of the user and/or based on an effect that a current purchase (e.g., being attempted or requested by the user) will have on the overall purchase score of the user. For example, as the first user attempts to purchase groceries from the grocery store, the one or more light sources may illuminate with a green color. However, as the first user attempts to purchase the sporting equipment from the sporting equipment store, the one or more light sources may illuminate with a red color. The one or more light sources may be instructed to illuminate in response to any of a variety of events and/or reasons, such as in response to a provider system (e.g., a point of sale system) requesting payment from an account of the first user.

Additionally or alternatively, the purchase device may include a speaker and/or a haptic device.

The purchase devices may also include other features, such as preloaded or set amounts that are available to the users and that are based on the overall purchase scores. The preloaded or set amounts may also be associated with other types of limits, such as for use to purchase only certain types of goods and/or services, to purchase only from certain stores, to purchase only via in-person shopping or only via online shopping, and/or to purchase only within certain time periods (e.g., one time period, such as a two hour window; recurring time periods, such as only during daytime hours). For example, at an end of the first day, the tracking system may preload or set a first amount (e.g., 100 dollars) for the purchase device of the first user based on the overall purchase score (e.g., higher score) at that time. The tracking system may also apply no limits or a first set of limits, such as limits that the 100 dollars is only for use on purchases made during daytime hours. Then, at the end of the second day, the tracking system may preload or set a second amount (e.g., 50 dollars) for the purchase device of the first user based on the overall purchase score (e.g., lower score) at that time. The tracking system may also apply a second set of limits, such as limits that the 50 dollars is only for use on purchases of essential items and/or services made during daytime hours.

With the forgoing in mind, FIG. 1 is a schematic diagram of a tracking system 10 (e.g., purchase tracking system), in accordance with embodiments of the present disclosure. The tracking system 10 may include various computers, terminals, software applications, and networks. The tracking system 10 may include a central management system 12 that is configured to receive purchase data from various sources, such as from one or more point-of-sale (POS) systems 14 (e.g., merchant systems) and/or from one or more user devices 16 (e.g., mobile phones, tablets, personal computers, purchase devices), for example.

The purchase data may be related to purchases made by a user (e.g., purchaser). The purchase data may include an identifier of the user (e.g., a unique identifier), a timestamp for the purchase (e.g., date and/or time), characteristics of the good(s) and/or service(s) purchased (e.g., a price and/or a type), and/or a store that provided the good(s) and/or service(s). It should be appreciated that the purchase data may be in the form of a receipt for the purchase (e.g., a paper or electronic receipt). For example, the POS systems 14 may send a copy of the receipt for the purchase to the central management system 12, such as automatically in response to completion of the purchase. Additionally or alternatively, the user may use an imaging device (e.g., camera) of the user device 16 to obtain an image of the receipt for the purchase and may use the user device 16 to send the receipt for the purchase to the central management system 12, such as in response to obtaining the receipt for the purchase. Additionally or alternatively, the central management system 12 may communicate with an inventory management system to determine and/or to notify the user of items in stock, which may facilitate purchase decisions and/or a purchase score for the purchase. Furthermore, it should be appreciated that the user may be considered to be part of a group (e.g., family of users), and the central management system 12 may assess purchases and/or scores (e.g., purchase scores and/or overall purchase scores) for the group based on purchases completed by all of the users in the group (e.g., the purchases made by the user may affect the group).

In some embodiments, the central management system 12 may have access to an electronic mail inbox for the user (e.g., via an application running on the user device 16) and the central management system 12 may retrieve the receipt for the purchase from the electronic mail inbox for the user (e.g., via word searching or other filtering techniques; in cases in which the POS systems 14 send the receipt for the purchase to the electronic mail inbox for the user). In some such cases, the central management system 12 may periodically (e.g., hourly, daily, weekly) scan the electronic mail inbox for the user. In some such cases, the central management system 12 may receive an indication of a location of the user (e.g., from a global positioning sensor or other position sensor) in the user device 16, correlate the location to a retail store (e.g., home improvement store) to determine that the user is in the store, and then initiate a scan of the electronic mail inbox at some time (e.g., 5, 15, or 30 minutes) after determining that the user is in the retail store or has left the retail store, and/or increase a rate of scan of the electronic mail inbox for some time (e.g., from a first lower rate, such as daily, to a second higher rate, such as every minute until the receipt for purchase is identified or until some time passes, such as 30 minutes) after determining that the user is in the retail store or has left the retail store. In some embodiments, the user may manually forward the receipt for the purchase to the central management system 12 from the electronic mail inbox of the user. Indeed, any of a variety of techniques may be utilized to provide the purchase data to the central management system 12, such as via text message, images of physical receipts, images of a display of the POS systems 14, images of checks, or the like.

In any case, the central management system 12 may obtain the purchase data, which may include at least some of the purchase data in the form of the receipts for purchases. As discussed in more detail below, the central management system 12 may store the purchase data, such as in one or more databases 34 (e.g., purchase data repository). Furthermore, the central management system 12 may link the purchase data with the user in the one or more databases 34 to enable efficient data mining and data analysis.

The central management system 12 may carry out other operations, such as assessing the purchase data and calculating an overall purchase score (e.g., rating) for the user based on the purchase data. In some embodiments, the central management system 12 may assess the purchase data on a per item (or per service) basis. For example, the central management system 12 may determine that the purchase included an essential grocery item (e.g., milk, bread, fruits, vegetables), a non-essential grocery item (e.g., candy, alcohol), an essential clothing item (e.g., winter coat), and a non-essential housewares item (e.g., wall art). In addition to a type (e.g., grocery, clothing, housewares) and a category (e.g., essential, non-essential), the central management system 12 may also determine other characteristics, such as a cost, a location, fees incurred, sales applied, or the like, on the per item (or per service) basis. The central management system 12 may have access to a lookup table and may use the lookup table to categorize (e.g., as essential, non-essential, type of good) by matching characteristics (e.g., description, cost) of the various items and/or services (e.g., a winter coat under a threshold cost is an essential clothing item).

In some embodiments, the central management system 12 may additionally access a prior purchase history of the user to determine whether certain items (or services) are essential or non-essential. For example, a clothing item (e.g., winter coat) may be considered essential if the user has not purchased a similar clothing item within a certain period of time (e.g., within a prior year) and/or if a respective size of the clothing item varies from a respective size of the similar clothing item. Furthermore, the central management system 12 may access the purchase data of other users to determine whether the user paid a high price and/or additional fees. For example, if the user paid ten dollars for an item at a first store, and a different user paid two dollars for the same item at a second store, the central management system 12 may determine that the user did not take the time to locate or to purchase the item on sale, and the central management system 12 may set a lower score for the item for the user (e.g., as compared to a higher score for the same item for the different user).

The central management system 12 may calculate a per item score and/or a purchase score based on the assessment of the purchase data for the purchase. For example, the central management system 12 may analyze the characteristics of the items (or the services) in the purchase and assign respective scores to each of the items (or the services) in the purchase. In the above-noted example, the central management system 12 may assign a first score (e.g., 10) to the first essential grocery item, a second score (e.g., 5) to the second non-essential grocery item, a third score (e.g., 9) to the first essential clothing item, and a fourth score (e.g., 4) to the non-essential housewares item. Then, based on the respective scores for each of the items (or the services) in the purchase, the central management system 12 may assign a purchase score to the purchase. The purchase score may be an average or a median of the respective scores for each of the items (or the services) in the purchase. In the above-noted example, the central management system 12 may assign the purchase score of 7, which is an average of the respective scores for each of the items in the purchase.

Furthermore, based on the purchase score, the central management system 12 may calculate (e.g., adjust; update) an overall purchase score for the user. In some embodiments, the user may be assigned a default or initial overall purchase score. The default or initial overall purchase score may be the same for all users who register and/or utilize the tracking system 10. For example, all users may begin with the default or initial overall purchase score of 10 (or a highest available overall purchase score), 1 (or a lowest available purchase score), or any score therebetween. However, in some embodiments, the default or initial overall purchase score may be different for different users (e.g., groups of users) and/or personalized for each user. For example, the default or initial overall purchase score may be a first score (e.g., 10 or a highest available overall purchase score) for the user and/or all users in a first group of users, a second score (e.g., 8 or an intermediate overall purchase score) for another user and/or all other users in a second group of users, and so on. In such cases, the default or initial overall purchase score for the user may be based on characteristics of the user, such as a credit score, an income level, an amount of debt, an amount of assets, age, gender identity, residence location, prior purchase data available to the central management system 12, or the like. The characteristics of the user may be stored in one or more databases 34 that are accessible to the central management system 12 and/or may be provided to the central management system 12 from a credit bureau organization, a financial services organization, an input from the user, and/or from any other suitable source. The default or initial overall purchase score may only be assigned upon registration prior to receipt of purchase data (or additional purchase data); however, in some embodiments, the overall purchase score may be reset to the default or initial overall purchase score for various reasons, such as in response to request by the user, periodically (e.g., at the beginning of a time period, such as each month or year), and so on.

In any case, the default or initial overall purchase score may be adjusted over time (e.g., dynamically; in substantially real-time) on the purchase data collected for the user. Thus, the user may begin with the default or initial overall purchase score of 10. Then, following the purchase with the purchase score of 7, the central management system 12 may adjust (e.g., lower) the default or initial purchase score of 10 to calculate the overall purchase score. For example, the central management system 12 may calculate the overall purchase score to be 8.5, which is an average of the default or initial purchase score of 10 and the purchase score of 7. However, it should be appreciated that the central management system 12 may calculate the overall purchase score in any suitable manner. Furthermore, the central management system 12 may utilize any suitable scale for calculating the various purchase scores (e.g., on a scale of 1-10, 1-100, 1-1000, 100-1000) and/or outputting indications of the various purchase scores (e.g., A-F, A-Z).

Additionally, the central management system 12 may then continue to update and maintain the overall purchase score for the user. For example, if the user makes an additional purchase with a respective purchase score of 5.5, the central management system 12 may calculate (e.g., adjust) the overall purchase score to be 7, which is an average of the overall purchase score of 8.5 prior to the purchase and the respective purchase score of 5.5. In this way, the central management system 12 may update and maintain the overall purchase score for the user over time, such that the overall purchase score for the user may continue to reflect an ability of the user to make appropriate purchases. The overall purchase score may assist and encourage the user be thoughtful about purchases and/or to have good spending habits. The overall purchase score may also be used by business organizations to track, rank, and/or to provide incentives for employees and/or customers (e.g., rewards, such as bonuses, for higher scores over a reward threshold).

It should be appreciated that the central management system 12 may utilize one or more algorithms that weight (e.g., apply a weighting factor) the item/service scores and/or the purchase scores, which may reduce effects from small purchases (e.g., low cost purchases) and/or reduce fluctuations in the overall purchase score with each purchase. For example, if the user makes the additional purchase with the respective purchase score of 5.5, the one or more algorithms may calculate (e.g., adjust) the overall purchase score to be 8.2, which is only slightly lower than the overall purchase score of 8.5 prior to the purchase. The weighting factor may vary based on a number of items (or services) in the purchase, a total dollar amount of the item/service/purchase, or the like. As another example, the central management system 12 may keep a log of all purchases made by the user, and the overall purchase score may be calculated as an average or a median of all per item/service scores for the user and/or all purchase scores for the user. In some cases, certain prior purchases are purged or cut after a period of time (e.g., after 0.5, 1, 2, or more years) and are excluded from the calculation of the overall purchase score. In some cases, certain prior purchases are purged or cut such that the overall purchase score is based on a certain number of purchases (e.g., the most recent 10, 100, 1000, or more purchases) and/or a certain number of items (e.g., the most recent 10, 100, 1000, or more items). The central management system 12 may also consider varying costs due to locale, inflation, and/or events (e.g., storms, pandemics) to calculate the purchase score and/or the overall purchase score for the user. Furthermore, the central management system 12 may provide respective overall purchase scores for different categories and/or types of goods and/or services, such as one overall purchase score related to essentials for the user and another overall purchase score related to non-essentials for the user.

It should also be appreciated that the central management system 12 may also be configured to calculate and/or to output the overall purchase score for certain prior periods of time. For example, the user may request a report that shows a first overall purchase score for a prior calendar year and a second overall purchase score for a current calendar year (which may be different from a third overall purchase score that is based on both the prior calendar year and the current calendar year). The central management system 12 may be configured to generate and/or output graphs with one or more lines that represent the overall purchase score(s) over time and/or calculate various metrics (e.g., absolute change, rate of change). The central management system 12 may also be configured to receive inputs from the user and output an indication of the purchase data, the per item/service score(s), and/or the purchase score(s). For example, upon receipt of inputs that request explanation of the overall purchase score, the central management system 12 may output an indication of the purchase data associated with the purchase with the lowest purchase score and/or the highest purchase score. In this way, the user may be able to access information about their spending habits over time. Additionally details and examples of information that may be output by the central management system 12 (e.g., for display on the user device 16) are shown and described with reference to FIGS. 2-4.

The central management system 12 may be triggered to calculate the overall purchase score for the user in response to various events and/or at various times, such as upon each request and/or attempt to complete a purchase by the user, upon each completion of a purchase by the user, upon completion of a threshold number (e.g., 1, 2, 3, 4, 5, 10, or more) of purchases by the user, upon purchase of a threshold number (e.g., 1, 2, 3, 4, 5, 10, or more) of items and/or services by the user, upon completion of purchase(s) that together exceed a threshold dollar amount (e.g., 10, 50, 100, 500, or more dollars), upon receipt of new purchase data (e.g., receipt), upon receipt of a request from the user or other entity (e.g., a financial services institution), and/or periodically (e.g., according to a schedule, such as every 24 hours, weekly, or monthly). Thus, in some embodiments, the central management system 12 may accumulate and store the purchase data until occurrence of one of the triggering events. Then, the central management system 12 may assess all of the accumulated purchase data to calculate the overall purchase score. Such techniques may preserve processing power by only periodically calculating the overall purchase score. For example, the central management system 12 may calculate a respective per item score for each item purchased since the last update to the overall purchase score (e.g., each item purchased in the prior 24 hours), and then may adjust the overall purchase score based on the respective per item score for each item purchased since the last update to the overall purchase score. In some such cases, the central management system 12 may effectively treat all items purchased since the last update to the overall purchase score as being part of one "purchase," and thus, the central management system 12 may calculate a purchase score based on the respective per item/service score for each item/service (e.g., the purchase score for all of the items purchased in the prior 24 hours).

As noted herein, the central management system 12 may utilize one or more algorithms to calculate the various scores. Furthermore, it should be appreciated that the overall purchase score may increase or remain unchanged in response to refrain from all purchases (e.g., no purchases over a time period). In some embodiments, the overall purchase score may increase or remain unchanged only in response to refrain from all purchases (e.g., no purchases over a time period). That is, any and all purchases (for essential and/or non-essential items and/or services) cause the overall purchase score to decrease. However, in some cases, the overall purchase score may increase or remain unchanged in response to completion of purchases of essential items and/or services (e.g., no purchases of non-essential items and/or services over a time period). While certain examples include higher scores to represent or indicate appropriate purchases and better spending habits and lower scores to represent or indicate inappropriate purchases and worse spending habits, it should be appreciated that the scores may be utilized in a different manner (e.g., higher scores for inappropriate purchases and worse spending habits, and lower scores for appropriate scores and better spending habits; users strive for lower scores and/or have improved benefits/limits for lower scores).

With reference to FIG. 1, the POS systems 14 may be defined as hardware systems for processing payments for transfer of goods (e.g., items; merchandise) and/or services (e.g., repair services, installation services) from a provider (e.g., merchant) to the user. It should be noted that, in addition to processing the payments for purchases, the POS systems 14 may also operate to facilitate returns of goods and/or cancellation of services. Furthermore, the central management system 12 may count and record returns and refunds to adjust the purchase score and/or the overall purchase score for the user. To obtain the purchase data, the POS systems 14 may include various devices, such as a scanner 18 that is configured to scan a code (e.g., barcode) associated with an item being purchased and/or a provider POS system 20 that is configured to enable the user to input the identifier (e.g., a phone number; a card, such as a payment card). As noted above, the POS systems 14 may provide the purchase data to the central management system 12 and/or the user device 16 may enable the user to take an image of a receipt that includes the purchase data, to input the purchase data (e.g., manually via a property value management application running on the user device 16), and/or to provide the purchase data in any of a variety of other ways (e.g., via electronic mail).

As shown, the central management system 12 may include a memory device 52 and/or storage device 54 that stores code (or instructions) and a processor 56 that functions to process the code and control operations in response to the code. The central management system 12 may also include a communication component 58 and input/output (I/O) ports 60 that operate to facilitate communication between the central management system 12 and other devices and systems (e.g., via a network).

The central management system 12 may receive the identifier, the timestamp, and/or the characteristics of the good(s) and/or the service(s) for one or more POS transactions. In this way, the central management system 12 may obtain the purchase data for multiple POS transactions (e.g., associated with multiple users and multiple retail stores). For each user, who may each have or qualify for purchase tracking (e.g., managed by the central management system 12 or by an entity associated with the central management system 12), the central management system 12 may aggregate, analyze, and/or store the purchase data collected over time. For example, the central management system 12 may use the identifier provided during each POS transaction to link the purchase data to the user (e.g., using a lookup table in the one or more databases 34 accessible to the central management system 12) and/or to update the overall purchase score for the user.

As shown in FIG. 1, the user may carry the user device 16, which is shown as a mobile phone with a display screen 44. In some cases, the user device 16 may operate as a purchase device that enables the user to complete purchases, such as online purchases via an application on the user device 16 and/or in-store purchases via interaction between the user device 16 and the POS system 14. Additionally or alternatively, the user may carry or have another type of purchase device 64, such as a payment card (e.g., credit card, debit card, gift card) and/or a wearable device. For example, the payment card may be a credit card with an integrated circuit chip that is readable by the POS system 14, a gift card with a printed numeric code that can be entered into the POS system 14, and/or a wearable device with a radiofrequency identification (RFID) tag that is readable by the POS system 14 to thereby enable the POS system 14 to request and/or to receive payment from an account associated with the user. It should be appreciated that the user device 16 and/or the purchase device 64 may include components (e.g., power source, processor, memory, communication device) to enable the techniques disclosed herein.

In any case, the user device 16 and/or the purchase device 64 may be configured to provide various operational features. For example, the central management system 12 may be configured to generate and/or instruct an audible, visible, and/or tactile output to the user. For example, the central management system 12 may instruct illumination of one or more light sources 66 on the user device 16 and/or the purchase device 64 to provide feedback indicative of the purchase score and/or the overall purchase score to the user. For example, the one or more light sources 66 may illuminate based on and/or to reflect an effect that a current purchase (e.g., being attempted or requested by the user) will have on the overall purchase score of the user. In some such cases, as the user attempts to purchase essential items (e.g., groceries from a grocery store) and/or items that will have positive impact (e.g., increase) the overall purchase score of the user, the one or more light sources 66 may illuminate with a first color (e.g., green). However, as the user attempts to purchase non-essential items (e.g., sporting equipment from a sporting equipment store) and/or items that will have a negative impact (e.g., decrease) the overall purchase score of the user, the one or more light sources 66 may illuminate with a second color (e.g., red). In some embodiments, a number of lights may provide the overall purchase score of the user (e.g., a current score or the score upon completion of a current purchase). For example, the purchase device 64 may include a row or grid or some other (e.g., in some shape or pattern, such as a star shape or pattern) of ten light sources 66. Then, seven of the light sources 66 may illuminate in some color, such as green, to indicate that the overall purchase score of the user is a seven. Similarly, a number of lights may provide a change in the overall purchase score of the user (e.g., upon completion of the current purchase). For example, three of the light sources 66 may illuminate in some color, such as red, to indicate that the overall purchase score of the user will decrease by three upon completion of the current purchase. The one or more light sources 66 may be dedicated for this purpose (e.g., used only for this purpose; to provide the feedback on the purchase and/or the overall purchase score of the user). As may be appreciate the feedback and the devices that provide the feedback are technical features of the purchase device 64 that improve operation of the purchase device 64.

The one or more light sources 66 may illuminate in response to any of a variety of events and/or reasons, such as in response to a provider system (e.g., the POS system 14) requesting payment from an account of the first user and/or the user providing an indication that they would like to complete the purchase (e.g., items placed in a shopping cart in an application on the user device 16; user input via the user device 16). In this way, the central management system 12 may provide real-time (e.g., substantially real-time; during the purchase; after scanning the items or placing in a cart in an application, but prior to authorizing or completing payment) and efficient feedback to the user to encourage the user to practice better spending habits (e.g., avoid purchase of non-essential items) and/or to maintain a better (e.g., higher) overall purchase score. Additionally or alternatively, the audible output may be provided via speakers (e.g., one tone for a positive impact on the overall purchase score, and another tone for a negative impact on the overall purchase score) and/or the tactile output may be provided via haptic devices (e.g., one pattern for a positive impact on the overall purchase score, and another pattern for a negative impact on the overall purchase score). It should be appreciated that any suitable device may provide the sensory feedback (e.g., display, light, sound, and/or haptics), such as a device other than the user device 16 and/or the purchase device 64 (e.g., a device that is not used to complete the purchase, but that is in communication with the central management system 12; a device that is worn, carried, and/or embedded in the user; a belt, a pager, a bracelet, an car piece, glasses, necklace). For example, the device may be a belt or a bracelet that illuminates, sounds an audible alarm, vibrates, and/or tightens to provide the sensory feedback.

As noted herein, in some embodiments, the purchase device 64 may include a RFID tag that is readable by the POS system 14. The RFID tag may include power harvesting capabilities, such that communication between the RFID tag and a RFID reader of the POS system 14 provides power that may be utilized to illuminate the one or more light sources 66, to activate the speakers, and/or the haptic devices. Further, the communication between the RFID tag and the RFID reader of the POS system 14 may include instructions for the color to present via the one or more light sources 66. Thus, the central management system 12 may receive information from the user device 16 and/or the POS system 14 (e.g., an indication that the user is attempting to complete a purchase with the purchase device 64), the central management system 12 may determine an effect that the purchase will have on the overall purchase score, and then the central management system 12 may instruct the POS system 14 to communicate the instructions as to the color to present via the one or more light sources 66 via the RFID tag/reader. In this way, the purchase device 64 may be lightweight and compact (e.g., a typical payment card, such as less than 9 centimeters in length by less than 5 centimeters in width and/or less than 1, 0.8, or 0.5 centimeters in thickness) without on-board batteries and without substantial on-board processing/memory components and without substantial on-board communication components (e.g., long-range, Bluetooth, Wi-Fi), but may still provide the feedback of the overall purchase score on the purchase device 64 itself, as disclosed herein. However, in some embodiments, the purchase device 64 includes on-board batteries (e.g., rechargeable and/or replaceable), substantial on-board processing/memory components, and/or substantial on-board communication components.

In some embodiments, the central management system 12 may control access to an account associated with the user and/or be in communication with a financial services system that controls the account associated with the user to block transfer of funds to complete the purchase until the output is provided to the user, which may provide time for the user to decide whether to proceed with the purchase or to cancel the purchase. In some embodiments, the central management system 12 may block the transfer of funds by locking an application on the user device 16. In some cases, the central management system 12 may block the transfer of funds until the user provides an input (e.g., via the user device 16) to confirm receipt of the output and to approve the purchase.

The user device 16 and/or the purchase device 64 may be linked to the account of the user and/or may be preloaded with an amount of funds. The amount of funds may be based, at least in part, on the overall purchase score for the user. The amount of funds may be accompanied by other types of limits, such as limits with respect to a type of item and/or service that can be purchased with the amount of funds. Additionally or alternatively, the limits may relate to a store, in-person shopping, online shopping, and/or certain time periods (e.g., a single time period, such as a two hour window on one day; recurring time periods, such as only during daytime hours).

As one example, at an end of a day, the tracking system 10 may preload a first amount (e.g., 100 dollars) for the user device 16 and/or the purchase device 64 of the user based on the overall purchase score for the user at that time. The tracking system 10 may also apply no other limits or a first set of additional limits, such as limits that the 100 dollars is only for use on purchases made during daytime hours. However, at an end of a next day, the tracking system 10 may preload a second amount (e.g., 50 dollars) or the user device 16 and/or the purchase device 64 of the user based on the overall purchase score (e.g., lower score) at that time. The tracking system 10 may also apply a second set of additional limits, such as limits that the 50 dollars is only for use on purchases for essential items and/or services made during daytime hours. Thus, the limits may vary based on the overall purchase score for the user (e.g., a lower overall purchase score triggers additional limits; a higher overall purchase score triggers no or fewer limits). In some embodiments, the preload amount and the limits may be updated and applied in real-time (e.g., substantially real-time; within minutes of completion of a purchase and/or receipt of new purchase data) to assist the user to practice better spending habits and/or maintain a better (e.g., higher) overall purchase score. For example, should the user spend 100 dollars on a non-essential item or service (e.g., at a casino), the overall purchase score may drop in real-time. Additionally, in real-time, the preload amount may be reduced and/or limits increased to encourage the user to practice better spending habits and to block significant negative effects on the overall purchase score of the user.

It should be appreciated that the tracking system 10 may establish multiple buckets with different preload amounts for the user, and each of the multiple buckets may be for a particular type of item and/or service (e.g., one bucket is for groceries, one bucket is for clothing, one bucket is for non-essential entertainment, and so on). In some cases, the multiple buckets may be accessible with the user device 16 and/or the purchase device 64 (e.g., the multiple buckets are accessible with each device). However, each of the multiple buckets may be accessible with only a single device (e.g., one bucket is accessible with one purchase device 64 and another bucket is accessible with another purchase device 64). For example, the user may carry a first purchase device 64 that provides access to a first preload amount in a first bucket for groceries, a second purchase device 64 that provides access to a second preload amount in a second bucket for clothing, and so on.

The central management system 12 may update the preload amount(s) based on the overall purchase score for the user. In some cases, the central management system 12 may determine and transmit (e.g., via the network) the preload amount(s) to be stored locally on the user device 16 and/or the purchase device 64. In some cases, the central management system 12 may determine the preload amount(s), receive indications of requests and/or attempts to make purchases, and then provide an appropriate output. For example, the appropriate output in response to a dollar amount of a requested purchase exceeding the preload amount may include providing an audible and/or a visible output for the user. The audible and/or visible output for the user may be presented via the user device 16 and/or the purchase device 64. The visible output may include illumination of the one or more light sources 66 on the user device 16 and/or the purchase device 64. In some embodiments, the visible output may include a red light in response to the dollar amount of the requested purchase exceeding the preload amount and/or a green light in response to the dollar amount of the requested purchase being below the preload amount. The tracking system 10 may quickly (e.g., in real-time) and efficiently provide this feedback to the user during a transaction to purchase an item and/or service, such as after the items are placed in a cart of an application on the user device 16 and before the user is prompted to complete the purchase of the items. The tracking system 10 may quickly and efficiently provide this feedback by transmitting (e.g., via the network) instructions from the central management system 12 to the user device 16 and/or the purchase device 64. However, as noted herein, the preload amount(s) may be stored locally on the user device 16 and/or the purchase device 64, and thus, the user device 16 and/or the purchase device 64 may analyze certain inputs (e.g., items in the cart and the preload amount(s)) to determine and to provide the audible and/or visible output to the user.

Figure 2:
FIG. 2 is a schematic representation of a notification on a graphical user interface that may be presented by the tracking system, in accordance with an embodiment of the present disclosure.

FIG. 2 is a schematic representation of a notification 70 on a graphical user interface 72 that may be presented on the user device 16, in accordance with an embodiment of the present disclosure. As shown, the notification 70 may include an indication of an overall purchase score for the user. In some embodiments, the notification 70 may be presented on the user device 16 in response to calculation (e.g., update) of the overall purchase score for the user, upon each request and/or attempt to complete a purchase by the user, upon each completion of a purchase by the user, upon receipt of a request from the user or other entity (e.g., a financial services institution), and/or periodically (e.g., according to a schedule, such as every 24 hours, weekly, or monthly). The notification 70 may be provided as a pop-up notification without the user manipulating the user device 16 to select and to access an application. Alternatively, an initial notification may be provided as the pop-up notification, and then upon selection of the pop-up notification, an application opens on the user device 16 and enables display of the notification 70. Upon selection of a virtual button (e.g., "CLICK FOR MORE DETAILS") presented in the notification 70, the user may access additional information, such as the additional information shown in FIGS. 3 and 4.

Figure 3:
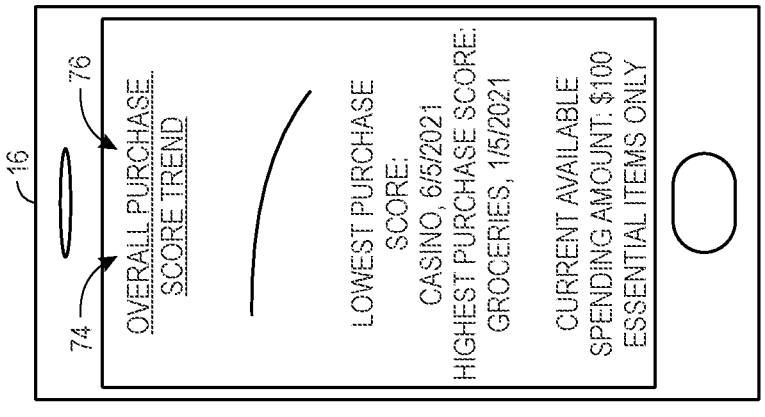
FIG. 3 is a schematic representation of another notification on a graphical user interface that may be presented by the tracking system, in accordance with an embodiment of the present disclosure.

FIG. 3 is a schematic representation of another notification 74 on a graphical user interface 76 that may be presented on the user device 16, in accordance with an embodiment of the present disclosure. As shown, the notification 74 may include an indication of a trend in the overall purchase score over time, as well as certain purchases that led to the overall purchase score for the user. The notification 74 may also include an indication of a preload amount and/or limits in place, such as a limit that the user is only permitted to purchase essential items (e.g., using the user device 16 and/or other purchases devices associated with the user).

Figure 4:
FIG. 4 is a schematic representation of another notification on a graphical user interface that may be presented by the tracking system, in accordance with an embodiment of the present disclosure.
Figure 4:
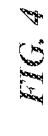

FIG. 4 is a schematic representation of another notification 78 on a graphical user interface 80 that may be presented on the user device 16, in accordance with an embodiment of the present disclosure. As shown, the notification 78 may include an alert along with an explanation of the alert, such as that a current purchase, if completed by the user, will have a negative impact (e.g., reduce) the overall purchase score of the user. The alert may be color coded, such as red to convey that the current purchase will have a negative impact on the overall purchase score of the user and/or green to convey that the current purchase will have a positive impact on the overall purchase score of the user. As noted herein, the alert may also be provided in other ways, such as via illumination of the one or more light sources on any purchase device (e.g., the user device 16 and/or the purchase device 64 of FIG. 1). Additionally, FIGS. 2-4 merely provide some examples of information that may be displayed for visualization by the user, and it should be appreciated that the tracking system 10 may provide any of a variety of outputs to the user.

Figure 5:
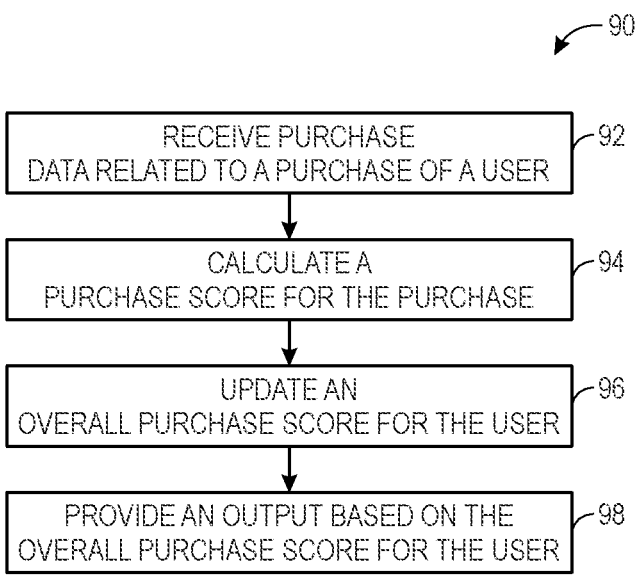
FIG. 5 is a flow diagram of a method of using the tracking system to track purchases, in accordance with an embodiment of the present disclosure.

FIG. 5 is a flow diagram of a method 90 of using the tracking system 10 to track purchases, in accordance with an embodiment of the present disclosure. The flow diagram includes various steps represented by blocks. Although the flow diagram illustrates the steps in a certain sequence, it should be understood that the steps may be performed in any suitable order and certain steps may be carried out simultaneously, where appropriate. Further, certain steps may be omitted and/or other steps may be added. While certain steps may be performed the processor 56 of the central management system 12, it should be understood that the steps or portions thereof may be performed by any suitable processing device.

In step 92, the central management system 12 may receive purchase data related to a purchase of the user. The purchase data may be in the form of a receipt for the purchase (e.g., a paper or electronic receipt). For example, the POS systems 14 may send a copy of the receipt for the purchase to the central management system 12, such as automatically in response to completion of the purchase. Additionally or alternatively, the user may use an imaging device (e.g., camera) of the user device 16 to obtain an image of the receipt for the purchase and may use the user device 16 to send the receipt for the purchase to the central management system 12, such as in response to obtaining the receipt for the purchase.

In step 94, the central management system 12 may analyze the purchase data to calculate a purchase score for the purchase. The central management system 12 may assess the purchase data on a per item (or per service) basis in order to calculate the purchase score for the purchase. For example, the central management system 12 may analyze the characteristics of the items (or the services) in the purchase and assign respective scores to each of the items (or the services) in the purchase. Then, based on the respective scores for each of the items (or the services) in the purchase, the central management system 12 may assign the purchase score to the purchase. The purchase score may be an average (e.g., average or weighted average) of the respective scores for each of the items (or the services) in the purchase.

In step 96, the central management system 12 may use the purchase data and/or use the purchase score for the purchase to update an overall purchase score for the user. The overall purchase score may generally reflect an ability of the user to make appropriate purchases and/or avoid non-essential purchases. The central management system 12 may be triggered to calculate the overall purchase score for the user in response to various events and/or at various times, such as upon each request and/or attempt to complete a purchase by the user, upon each completion of a purchase by the user, upon completion of a threshold number (e.g., 1, 2, 3, 4, 5, 10, or more) of purchases by the user, upon purchase of a threshold number (e.g., 1, 2, 3, 4, 5, 10, or more) of items and/or services by the user, upon completion of purchase(s) that together exceed a threshold dollar amount (e.g., 10, 50, 100, 500, or more dollars), upon receipt of new purchase data (e.g., receipt), upon receipt of a request from the user or other entity (e.g., a financial services institution), and/or periodically (e.g., according to a schedule, such as every 24 hours, weekly, or monthly). Thus, in some embodiments, the central management system 12 may accumulate and store the purchase data until occurrence of one of the triggering events. Then, the central management system 12 may assess all of the accumulated purchase data to calculate the overall purchase score.

In step 98, the central management system 12 may generate and/or provide an output based on the overall purchase score for the user. For example, the central management system 12 may instruct illumination of one or more light sources 66 on the user device 16 and/or the purchase device 64 to provide feedback indicative of the overall purchase score to the user. As noted herein, the one or more light sources 66 may additionally or alternatively illuminate based on and/or to reflect an effect that a current purchase (e.g., being attempted or requested by the user; in real-time) will have on the overall purchase score of the user. As another example, the central management system 12 may instruct display of the overall purchase score, a trend in the overall purchase score over time, indications of other related metrics (e.g., the purchase data, the per item/service score(s), and/or the purchase score(s)), and/or alerts. In some embodiments, the output may include instructions for a preload amount and/or other types of limits on purchases by the user.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f).

However, for any claims containing elements designated in any other manner, it is intended that such elements are not to be interpreted under 35 U.S.C. 112 (f).

The invention claimed is:

1. A tracking system, comprising:
a payment card comprising one or more light sources;
one or more processors; and
a memory storing instructions executable by the one or more processors to cause the one or more processors to:
    receive purchase data related to a purchase being attempted by a user, wherein the purchase data indicates characteristics of one or more items of the purchase;
    determine a purchase score for the purchase based on the characteristics of the one or more items of the purchase;
    determine a change to an overall purchase score for the user that would occur upon completion of the purchase; and
    illuminate, prior to the completion of the purchase, the one or more light sources to indicate the change.

2. The tracking system of claim 1, wherein the characteristics of the one or more items of the purchase comprise a category, a type, and a cost.

3. The tracking system of claim 1, wherein the instructions are executable by the one or more processors to cause the one or more processors to block the completion of the purchase until the one or more processors illuminate the one or more light sources to indicate the change.

4. The tracking system of claim 1, wherein the payment card comprises a thickness of less than 1 centimeter.

5. The tracking system of claim 1, wherein the instructions are executable by the one or more processors to cause the one or more processors to instruct the one or more light sources to illuminate with a first color in response to the change being a negative impact on the overall purchase score for the user and a second color in response to the change being a positive impact on the overall purchase score.

6. The tracking system of claim 1, wherein the instructions are executable by the one or more processors to cause the one or more processors to provide a preload amount of funds available to the user based on the overall purchase score for the user.

7. The tracking system of claim 6, wherein the instructions are executable by the one or more processors to cause the one or more processors to establish one or more additional purchase limits for the user based on the overall purchase score for the user.

8. The tracking system of claim 1, wherein the instructions are executable by the one or more processors to cause the one or more processors to receive the purchase data from a point of sale (POS) system of a merchant.

9. The tracking system of claim 8, wherein the payment card comprises a radiofrequency identification (RFID) tag configured to communicate with a RFID reader of the POS system.

10. The tracking system of claim 1, wherein the instructions are executable by the one or more processors to cause the one or more processors to receive the purchase data related to the purchase being attempted by the user with the payment card.

11. The tracking system of claim 1, wherein the instructions are executable by the one or more processors to cause the one or more processors to assess a prior purchase history of the user to determine the characteristics of the one or more items of the purchase.

12. A method of operating a tracking system, the method comprising:

receiving, at one or more processors, purchase data related to a purchase being attempted by a user, wherein the purchase data indicates characteristics of one or more items of the purchase;

determining, using the one or more processors, a purchase score for the purchase based on the characteristics of the one or more items of the purchase;

determining, using the one or more processors, a change to an overall purchase score for the user that would occur upon completion of the purchase; and providing, using the one or more processors and prior to the completion of the purchase and via a purchase device of the user, an output that indicates the change, wherein providing the output that indicates the change comprises illumination of one or more light sources on the purchase device.

13. The method of claim 12, comprising blocking, using the one or more processors, the completion of the purchase until the illumination of the one or more light sources on the purchase device.

14. The method of claim 13, wherein blocking, using the one or more processors, the completion of the purchase comprises interacting with a financial services provider system to block transfer of funds to a merchant.

15. The method of claim 12, wherein the purchase device comprises a payment card.

16. The method of claim 12, comprising providing, using the one or more processors, a preload amount of funds available to the user based on the overall purchase score for the user.

17. A tracking system, comprising:

a payment card comprising one or more light sources;

one or more processors; and a memory storing instructions executable by the one or more processors to cause the one or more processors to:

receive purchase data related to a purchase being attempted by a user with the payment card;

determine a purchase score for the purchase based on the purchase data;

determine a change to an overall purchase score for the user that would occur upon completion of the purchase; and illuminate, prior to the completion of the purchase, the one or more light sources to provide an output that indicates the change.

18. The tracking system of claim 17, wherein the payment card comprises a thickness of less than 1 centimeter.

19. The tracking system of claim 17, wherein the instructions are executable by the one or more processors to cause the one or more processors to instruct the one or more lights sources to illuminate with a first color in response to the change being a negative impact on the overall purchase score for the user and a second color in response to the change being a positive impact on the overall purchase score.

20. The tracking system of claim 17, wherein the instructions are executable by the one or more processors to cause the one or more processors to provide a preload amount of funds available to the user via the payment card based on the overall purchase score for the user.

* * * * *